United States Patent

[11] 3,626,295

[72] Inventor Akio Sabrui
Tokyo, Japan
[21] Appl. No. 883,659
[22] Filed Dec. 9, 1969
[45] Patented Dec. 7, 1971
[73] Assignee Nippon Electric Company, Limited
Tokyo, Japan
[32] Priority Dec., 1968
[33] Japan
[31] 43/90799

[54] TIME DIVISION MULTIPLEX COMMUNICATION SYSTEM
7 Claims, 11 Drawing Figs.

[52] U.S. Cl. .......... 325/4, 179/15 BS, 325/58, 343/176, 343/178, 343/179
[51] Int. Cl. .......... H04b 7/20
[50] Field of Search .......... 325/4, 58; 343/7.5, 179, 176, 178; 179/15 BS

[56] References Cited
UNITED STATES PATENTS

| | | | |
|---|---|---|---|
| 3,530,252 | 9/1970 | Puente .......... | 179/15 BS |
| 3,532,985 | 10/1970 | Glomb .......... | 325/4 |

*Primary Examiner*—Benedict V. Safourek
*Assistant Examiner*—Kenneth W. Weinstein
*Attorney*—Marn & Jangarathis

ABSTRACT: A time division multiple access communication system including earth stations and a satellite station wherein each earth station includes a paired transmitter and receiver for acquisition and burst synchronization; the transmitter sending first pattern signals, each identifying the start of one signaling frame including a plurality of frequency slots divided on a time basis to identify each earth station, to the satellite for reception and retransmission to the earth stations; the receiver deriving a reference time point from each received first pattern signal, for generating second pattern signals; detecting a time difference between time periods of the first and second pattern signals including a polarity indication of such difference; algebraically adding signals representing such time difference and polarity, a preassigned time interval during which the signal burst is to be transmitted, and the one signal frame and time position therein at which the signal burst is to be transmitted.

INVENTOR.
Akio Saburi
BY
Marn & Jangarathis
ATTORNEYS

INVENTOR.
Akio Saburi
BY
Marn & Jangarathis
ATTORNEYS

INVENTOR.
Akio Saburi
BY
Marn & Jangarathis
ATTORNEYS

INVENTOR.
Akio Saburi
BY
Marn & Jangarathis
ATTORNEYS

TIME DIVISION MULTIPLEX COMMUNICATION SYSTEM

BACKGROUND OF THE INVENTION

The invention relates to a time division multiple access communication system, and more particularly to the control of acquisition and burst synchronization in PCM-time division multiple access satellite communication system.

DESCRIPTION OF THE PRIOR ART

Multiple access communication allowing mutual communication between a number of earth stations via a single satellite is an efficient manner of achieving an increased channel efficiency. In the prior art, the communication band of a transponder mounted on the satellite is divided into a plurality of frequency bands, which are assigned to the respective earth stations for use with frequency modulation communication. Such division of the transponder capacity into preassigned frequency bands appears to ensure a satisfactory transmission and reception through the assigned band without causing disturbances to adjacent frequency bands which are similarly relayed by the satellite, though the problem of intermodulation noises arises because of the nonlinearity of the transponder response when a single transponder is loaded with many carrier waves. To avoid this defect, the output power from the transponder must be suppressed so that it operates in its linear range. In addition, where the transmission power of the respective earth stations differ from each other, the signal from an earth station or a transmitter-receiver of less power is more strongly affected by the intermodulation noise, so that it is necessary to provide an accurate control of the transmission power. Furthermore, the frequency bands utilized in the satellite communication include those on the order of 4 gHz or 6 gHz, which overlap the frequencies used in the terrestrial microwave channels, thereby presenting the problem of mutual interference therebetween.

By contrast, the PCM-time division multiple access (PCM-TDMA) system has the advantages of PCM system in that it is relatively insensitive to interference and of the time division system that the transponder does not receive more than one carrier wave at any given time so that the full utilization of the transponder power is possible without the risk of intermodulation noises.

An acquisition of the preassigned time slot explained later is based on the detection of a range from an earth station which desires to commence the transmission to the satellite that should relay the transmitted signal and a time rate of change of the range, which will be referred to hereinafter as a range rate, to forecast by calculation the position in time at which that earth station should transmit its signal so that the signal reaches the satellite in a predetermined timed relationship with respect to a reference time established in the transponder on the satellite. In the experimental PCM-TDMA communications heretofore conducted, the determination of the range and range rate relied on the use of high-precision instruments and an electronic computer. The burst synchronization also required a separate equipment which operates by detection of a phase difference. The installation of these is highly expensive.

SUMMARY OF THE INVENTION

The invention provides a transmitter-receiver for a time division multiple access satellite communication system including a self-contained, simple apparatus for determining the range and range rate which can be equally used for controlling both the acquisition and the burst synchronization. The entire circuitry can be formed with digital circuits incorporating integrated circuits to thereby improve the reliability of the communication system.

Therefore, it is an object of the invention to provide a communication system which enables the acquisition by a transmitting earth station of a preassigned burst at a given position in time, with a relatively simple apparatus and without adversely affecting adjacent bursts.

One of the features of the present communication system is the provision at both the transmitting and receiving terminals of its own station of respective pattern signal generators, each capable of discerning a time delay corresponding to the time period, Td (to be described later), required for a transmitted signal to return to the earth station through the satellite by which it is relayed. The pattern signal generator of the receiving terminal is operated to assume the same state as the pattern produced by the pattern signal generator of the transmitting terminal, except for the time delay of Td.

Another feature of the communication system is the provision of a reference timing circuit which operates upon receipt of a reference timing signal to detect, by observation of the patterns from said two signal generators, information concerning the range and the range rate between an earth station and the satellite, with respect to the reference time period, and to determine the position at which a signal is to be transmitted for acquisition, by a simple calculation based on the detected value and the position, $T_c$, preset for the insertion of the signal from its own station, as referenced to the reference time period.

A further feature of the communication system is the fact that the principle of above operations is equally applicable to the burst synchronization as well as to the acquisition.

In accordance with the present invention, a transmitter-receiver for time division multiple access satellite communication which includes means for receiving the signals from a satellite, means for deriving from the signals received from the satellite the reference time point of each frame of the time division multiplexed signals, and means for sending towards the satellite a pattern signal having a marking at least at each reference time point and to which the preassigned time slot for the burst to be used in the frame by the transmitter-receiver is known on the basis of a predetermined reference timing period, is characterized in that the transmitter-receiver includes a combination comprising first means for measuring on the basis of the timing period the interval between one of the reference points and the time point of reception of that one of the markings which appears for the first time posterior to the one reference time point, second means for measuring on the basis of the timing period the difference between the spacing of the markings as transmitted and the like spacing as received, and third means for deriving the algebraic sum of the preassigned time slot and the results measured by the first and the second means.

For a better understanding of the present invention, reference is made to the following detailed description to be taken in connection with the accompanying drawings.

BRIEF DESCRIPTION OF DRAWINGS

FIG. 4 shows a reference timing circuit, FIG. 5 shows a first pattern signal generator and FIG. 6 shows a synchronizing circuit and a second pattern signal generator, FIGS. 7*a* and *b* are time charts illustrating the synchronization monitoring operation by the second pattern signal generator of FIG. 6, and FIGS. 8, 9 and 10 are similar, yet more specific block diagrams of other parts shown in FIG. 2, and specifically

DESCRIPTION OF THE PREFERRED EMBODIMENT

Figure 1:
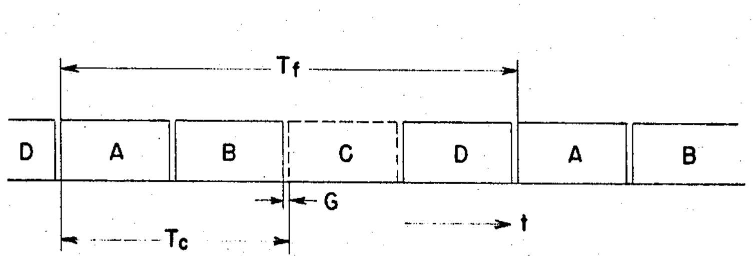
FIG. 1 is an explanatory block view of the time division multiple access communication with which the invention is concerned.

FIG. 1 shows an explanatory view of the time division multiple access communication with which the invention is concerned. Referring to this figure there are shown four blocks designated A, B, C and D on the abscissa which represents the time, these blocks indicating the allotment in that signals from four earth stations exist or may be present at the respective blocks, the signal in each block that is a time division multiplexed signal, being commonly referred to as a burst. The signals from the four earth stations utilize, in common, the same communication band of the single transponder on a satellite for mutual communication. The drawing shows that three stations A, B and D actually transmit signals, but that the station C does not as yet transmit its signal even though a position or time slot is assigned to the station for its transmission.

The signals from the stations A, B .... are transmitted in a series of bursts to be described later, which are repeated with a period of $T_f$ referred to as a frame. A frame may be a duration of 125 microseconds, for example. The position on the time axis of the respective stations must be fixed relative to the frame $T_f$, so that it is evident that some reference timing means must be provided in the system.

The reference time period may be provided by the signal transmitted from any given station which is chosen as a reference station, so that the position of other local stations may be determined in relation to the reference chosen. Alternatively, it may be derived from the average of the bit frequency of the signals being transmitted from the respective stations. At any rate, the reference timing signal to be used as the reference of the control is derived from the signals being transmitted from the reference station or other plural stations so as to maintain the synchronization of the time division multiple access communication. As above mentioned, this reference timing is repeated by the frame period $T_f$ which is an elemental period in the time division multiple access communication system. To simplify the explanation of the invention, it is on the understanding that a suitable one of the time points among the reference timing is chosen as a reference time point, i.e., an origin. In FIG. 1, the reference time point is assumed to be the beginning of the signal burst derived from the signals being transmitted from station A.

When it is desired that the C station starts to transmit a signal, this signal must be inserted in the time slot C assigned to the station C, or at the position designated by $T_c$ which is established according to the reference time period measured as an interval from the reference time point, without causing any disturbance to the signals from the stations A, B and D which are being transmitted. In addition, after the signal has been inserted, it is necessary to control the transmission time of the signal so that it does not overlap in time with the adjacent burst B and D and maintains an interval or guard, indicated by G, with respect to the latter. The former process is called an acquisition, and the latter process a burst synchronization.

Briefly stated, the acquisition process in one whereby the transmit time of a burst is to be determined so that the burst can be positioned at the preassigned time slot, which is C in the above example, determined by the reference time period. Because this process must not interfere with the signals from other stations which maintain communication, the signal used for the acquisition is of sufficiently low power level, as compared with that of other stations, to permit its being masked by the bursts from other stations if it should partly overlap with the adjacent bursts. Because a PCM-TDMA system has excellent characteristics against interference, this enables the interference to be prevented. In the preassigned time slot, the signal for acquisition will be disturbed by noises during transmission and therefore will be received with a low C/N (carrier power/noise power) ratio. Since the PCM-TDMA system has a further advantage that because the transponder on the satellite is operated in its saturation region for maximum power utilization, the acquisition signal transmitted at a lower power level can be received with substantially the same power as other signals of normal power level, with the consequence that clock recovery and code regeneration upon reception of the signal can be effected by using the same circuits as those used for signals of normal power level.

The function of the burst synchronization is to maintain the relative position on the same time axis of a burst once the acquisition has been achieved. In order to have a high channel efficiency, it is desirable that in the time slot the relative time space occupied by synchronization signals which are transmitted and received for the burst synchronization, be minimized. These synchronization signals are transmitted with a normal power so that they can be received with a high C/N ratio. While the acquisition process need only be performed once to determine the transmit time of the signal, the burst synchronization should be repeated to determine the transmit time in accordance with the relative movement of the satellite to the earth and also to maintain effectively the established time space for guard G between adjacent bursts.

Figure 2:
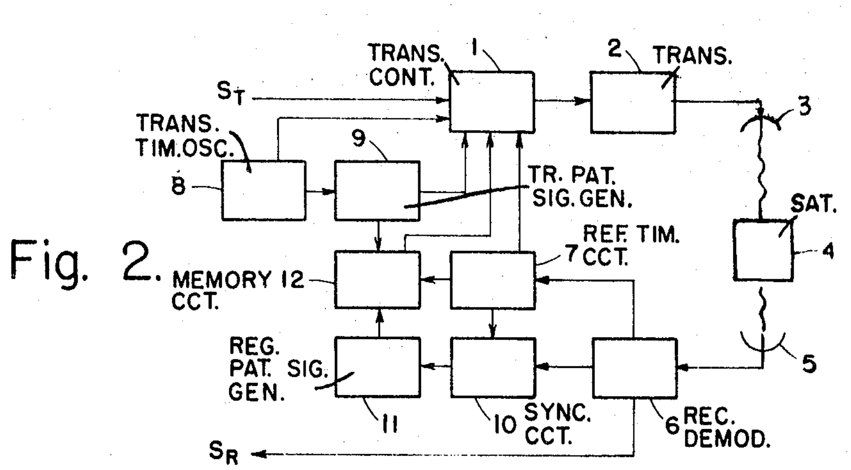
FIG. 2 is a block diagram of the system according to the invention.

FIG. 2 shows in block form one of the earth stations and a satellite relay station constituting a satellite communication system as a whole, which accepts signals $S_T$ such as voice, video and/or other data signals from external subscribers and transmits them via a satellite to the other earth stations or, on the other hand, which receives a similar signal as transmitted from other earth stations and supplies them as signal $S_R$ to the external subscribers.

Referring to FIG. 2, the signal to be transmitted is controlled by a transmit control circuit 1, which is described later herein in detail, before being transmitted through a transmitter 2 and an antenna 3 towards a satellite 4. The signal is received, amplified and retransmitted by the satellite 4, whereby the signal is directed to the earth where it is received. The signal from the satellite is received at a receiving station 5. In the usual earth station, one antenna is used for both transmission and reception, that is, the antenna 3 is practically equal to the antenna 5.

Where two or more earth stations are simultaneously transmitting signals, which are received at the other station via the satellite in a time division fashion illustrated in FIG. 1, the received signal at the other station is demodulated by a receiver 6 into a signal $S_R$. A reference timing circuit 7 derives reference timing from the received signals and generates various timing signals used for the determination of signal reception and transmission timing. A transmit timing oscillator 8 provides a clock signal for signal transmission. The above-mentioned system components, except the transmit control circuit 1, are similar in structure and function with those of the usual earth station.

The earth station incorporating the invention further includes at the transmitting terminal a pattern signal generator 9 and at the receiving terminal a synchronizing circuit 10, a pattern signal generator 11, and a memory circuit 12. The pattern signal generators 9 and 11 generate similar periodic pattern signals, each having a marking to distinguish its phase.

In the initial acquisition stage required for the determination of the transmit timing to insert a signal burst into an allotted time slot, signal $S_T$ is not abruptly transmitted but only the pattern signal of generator 9 is transmitted from the earth station to the satellite at a power level considerably below that of a normal signal burst. Because of its low power level, this pattern signal does not adversely affect communication in progress via the satellite between other earth stations. Through the satellite, the earth station transmitting the pattern signal also receives it for demodulation in the receiver 6. This demodulated pattern signal serves through the synchronizing circuit 10 to synchronize the receiving pattern signal generator 11 with the transmitting pattern signal generator 9. As a result, the pattern signal generator 11 generates a pattern signal having a phase difference (from that of the pattern signal of generator 9) corresponding to a time delay of a round trip from pattern generator 9 to pattern generator 11.

The memory circuit 12 stores the particular status or phase information concerning the pattern signals supplied by both generators 9 and 11 under control of the reference timing circuit 7, and generates three kinds of coincidence detection signals indicating the coincidences between the stored statuses and actual statuses of the respective pattern signals. These coincidence detection signals are received at the transmit control circuit 1 which calculates the transmit timing of the signal burst to be transmitted as aided by the reference timing signal generated in the reference timing circuit 7. Responsive to such calculations, the transmit control circuit 1 thus controls the timing of the transmission of the signal burst from that particular earth station.

Figure 3:
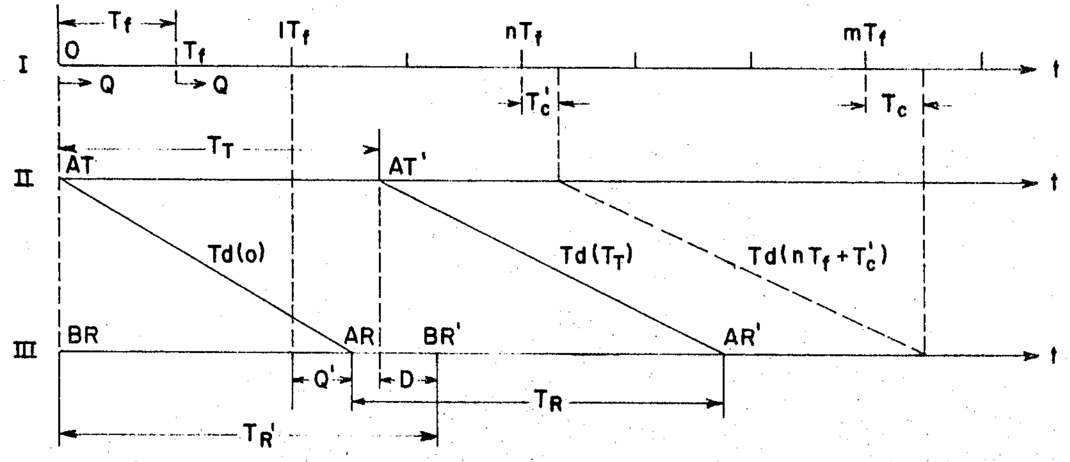
FIG. 3 is a time diagram for illustrating the principle of the invention.

FIG. 3 showing time diagrams useful for illustrating the operation of the invention in FIG. 2 include abscissa I representing a reference time $t$ obtained from the received reference timing signal of the pattern signal generator 11 (FIG. 2) in the time division communication according to FIG. 1, and abscissas II and III representing the statuses in time of the pattern signals provided by generators 9 and 11, respectively.

On abscissa I, the letter O signifies a time origin or a reference time point; $T_f$ is the period of the time division multiple access frame; Q indicates a position in the frame $T_f$; $l$, $m$ and $n$ represent integer numbers, respectively; $T_c$ shows the location of the time slot C assigned to earth station C as mentioned previously in regard to FIG. 1; and $T_c'$ shows the actual time position for the station C to transmit its signal burst against the reference timing. Determination of the time position $T_c'$ is the purpose of the present invention.

On abscissas II and III, A and B represent some status or phase conditions of the pattern signal generators 9 and 11, respectively; T and R identify transmitting and receiving terminals, respectively; $T_T$ and $T_R$ indicate time periods of the pattern signals generated by the pattern signal generators 9 and 11, respectively; and $T_d$ shows the phase difference between the pattern signals of the generators 9 and 11, and the round trip propagation time delay between the earth station C and the satellite 4. $T_d$ is a function of time and is indicated as $T_d(t)$ referring to the transmit time points $T_d(o)$, $T_d(lT_f)$ and $T_d(mTf+T_c')$. Also in abscissas II and III, Q' represents a fraction value of $T_d$ subtracted by integer multiples of $T_f$; and D shows the time difference between the time period $T_T$ of the pattern signal produced by the generator 9 of the transmitting terminal and the time period $T_R$ of the pattern signal produced by the generator 11 at the receiving terminal in FIG. 2. The value of the time position $T_c'$ is determined by the algebraic sum of $T_c$—$Q'\pm D$ as mentioned later. The algebraic sum $T_c'$ is calculated in the transmit control circuit 1 in response to the three coincidence signals supplied thereto from the memory circuit 12 as previously stated.

The operation of the invention to determine the time position $T_c'$ is now described with reference to FIGS. 2 and 3. Initially, it is assumed that the statuses AT and BR of the pattern signal generators 9 and 11, respectively, are stored in the memory circuit 12. Thereafter, the memory circuit 12 compares the stored statuses AT and BR with the actual statuses of the pattern signals supplied thereto by the generators 9 and 11. As a consequence of such comparison, the memory circuit 12 generates a first coincident signal when the status of the pattern signal of generator 9 is coincident with the stored status AT or when the generator 9 generates a pattern signal of the status AT' which is identical with the initially assumed status AT. This detects the time period $T_T$ of the pattern signal produced by the generator 9.

At the same time, the pattern signal of generator 9 is transmitted via the control circuit 1, transmitter 2 and antenna 2 to the satellite 4 from which the received pattern signal is retransmitted to the earth stations for reception at the antenna 5. This received signal is demodulated in demodulator 6 whose demodulated output activates synchronizing circuit 10 which controls the generator 11 to effect synchronization between the generators 9 and 11. Accordingly, the generator 11 produces a pattern signal having identical status with the pattern signal produced by generator 9, as the latter pattern signal transmitted from the transmitting terminal to the satellite 4 is received therefrom at the receiving terminal in FIG. 2. The generator 11 thus produces a pattern signal identical with that of generator 9 with a delay of the period $T_d$ which shows the phase difference between the pattern signals of the generators 9 and 11 or the round trip propagation time delay between the earth station C and the satellite 4 as hereinbefore mentioned.

The memory circuit 12 comparing the initially stored status AT with the actual status of the pattern signal of generator 11 produces a second coincident signal when the actual status of the pattern signal of generator 11 is coincident with the stored status AT, or when the generator 11 produces a pattern signal of the status AR, obviously, the pattern signal of status AR is produced at the receiving terminal in response to the reception thereat of the pattern signal of the status AT produced at the transmitting terminal of the earth station C in FIG. 2. This enables a detection of the phase difference $T_d$ above mentioned.

In addition, the memory circuit 12 comparing the stored status BR with the actual status of the pattern signal produced by generator 11 produces a third coincident signal when both such compared signals are coincident, or when the generator 11 produces a pattern signal whose status BR' is identical with the initially assumed status BR. This enables a detection of the period $T_R'$ of the pattern signal of the generator 11.

It is understood that the receiver-demodulator 6 at the receiving terminal not only receives the pattern signal of the generator 9 sent from the transmitting terminal in FIG. 2 but also receives communication signals from the stations A, B and D in time division multiplex fashion as shown in FIG. 1. These time division, multiplex, communication signals are received and demodulated activate the timing circuit 7 which derives timing signals utilized to control the transmit-control circuit 1, the synchronizing circuit 10, and the memory circuit 12.

The memory circuit 12 detects the period $Q'=(T_d-lT_f)$ due to the second coincident signals therein and the timing signal from the timing circuit, and also detects the period $D=(T_R'-T_T)$ due to the first and third coincident signals therein and the timing signals from the timing circuit 7. The signals corresponding to the detected periods Q' and D are applied to the transmit control circuit 1 which employs these signals together with the time period $T_c$ stored therein to calculate $T_c'=(T_c-Q'\pm D)$. This indicates the preassigned insert time position of the communication signals of the earth station C in one frame of the time division multiplex signals shown in FIG. 1 for transmission to the satellite 4. Accordingly, transmission of communication signals to the satellite 4 by the earth station C just after the elapsed time $T_c'$ from the beginning $nTf$ of the frame of the time division multiplex signals ensures such signals are inserted in the preassigned time slot of the earth station C in the frame of the time division multiplex signals shown in FIG. 1.

A further explanation of the invention, particularly with respect to the functioning of the components in FIG. 2, is given hereinafter in connection with FIGS. 4–10.

Figure 4:
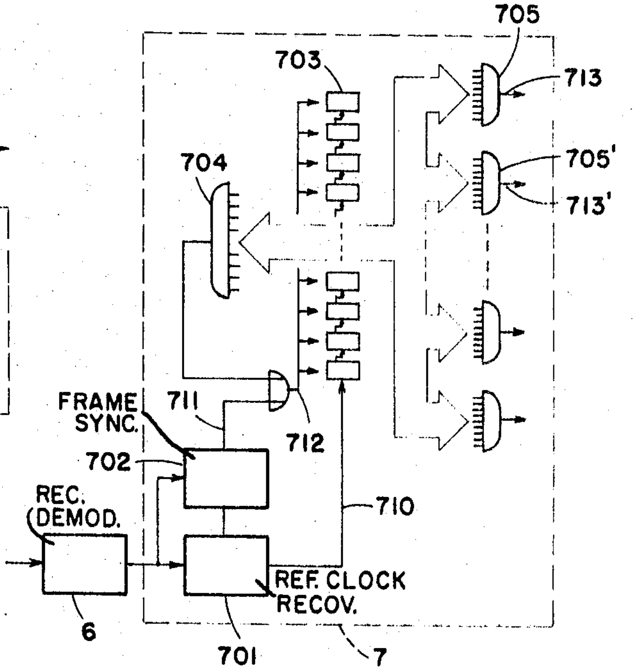

FIG. 4 shows the reference timing circuit 7 which is essentially frame counter having its period coincident with the period $T_f$ of one frame shown in FIG. 1. By way of an example, when the clock signal of the A station is chosen as the reference of the communication system, it extracts only the signal of the A station from the received signal demodulated by the receiver 6, and recovers the clock signal from the extracted signal to establish the frame synchronization. Specifically, the signal from the receiver is supplied to a reference clock recovery circuit 701 which extracts only the clock pulse from the signal of the reference station, which in the present example is the A station, and also to a frame synchronizer 702 which responds to the signal from the reference station to establish the frame synchronization. The circuit further includes a frame counter 703 which comprises an m-stage binary counter, which is driven by a reference clock signal 710 produced at the output of the circuit 701. When the synchronizer 702 detects a certain reference position in time from the signal of the reference station, the counter 703 is reset by the detection output 711, and the reset pulse 712 is automatically produced from a reset point decoder 704 when the content of the counter 703 arrives at a value corresponding to the period of frame, $T_f$. A timing signal which represents any position within a frame $T_f$ can be produced by forming a suitable logical product (AND-circuit) of outputs from various stages of the m-stage binary counter or the counter 703. Decoders 705, 705' .... are provided at the receiver terminal for supplying various timing signals 713, 713' .... to the related circuits. The transmit timing oscillator 8 determines the frequency and phase of the signal to be transmitted from the station shown, and generally is not in synchronism with the reference timing circuit 7.

Figure 5:
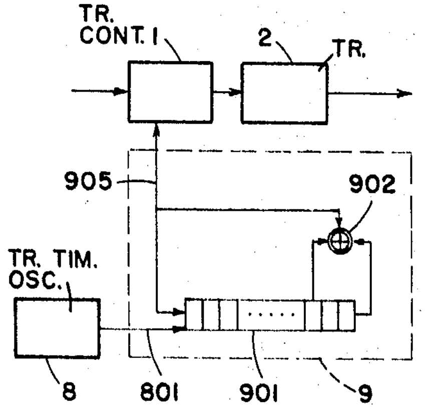
FIGS. 4 to 6 are circuit diagrams of certain parts shown in FIG. 2, and specifically

FIG. 5 shows the pattern signal generator 9 of the transmitting terminal. The generator 9 includes an n-stage shift register 901 which is operated by shift pulses or clock pulses 801 supplied by the transmitting oscillator 8. The shift register 901 is combined with a feedback circuit 902 that includes an EXCLUSIVE OR circuit to constitute a pseudo random noise signal (or PN-code) generator of known form. By suitably forming the feedback circuit 902, the PN-code generator produces a desired code having a repetition period up to the maximum value ($2^n-1$) bits. As is well known, if there is selected a pattern of *n* bits in succession from the PN-code, then there is no other pattern having the same structure as the selected pattern in one period of the PN-code. Therefore, a pattern composed of more than *n* bits may be used as a marking in the PN-code sequence. It is thus an essential feature of the present invention to utilize a pattern signal having such marking property as just mentioned. The factor *n* is chosen in the present instance so as to achieve a period which is longer than the reflection period, $T_d$. The output signal 905 from the feedback circuit 902 is transmitted successively during the acquisition process, through the transmit control circuit 1 and transmitter 2 to the satellite 4 at a low power level, and after the time delay of $T_d$, is received and demodulated by the receiver 6.

The signal, $S_R$, received and demodulated by the receiver 6 is also applied to the synchronizing circuit 10. The synchronizing circuit 10 has dual functions, one of which is to derive from the received signal only that signal which was transmitted from its own station in which such circuit 10 is provided in order to recover the clock signal, and the other of which is to synchronize the pattern output from the pattern signal generator 11 of the receiving terminal that is driven by the clock signal just mentioned, with the pattern signal generated by the pattern signal generator 9 of the transmitting terminal that has been relayed by the satellite 4 and received by the receiver 6. The pattern signal generator 11 generates a signal which is the same pattern as that provided by the pattern signal generator 9.

Figure 6:
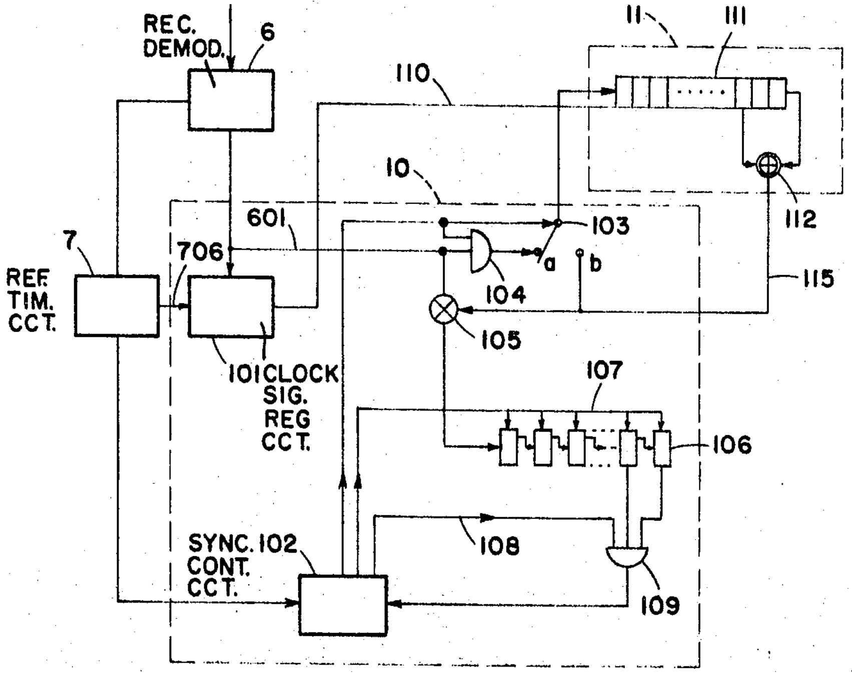
Figure 7:
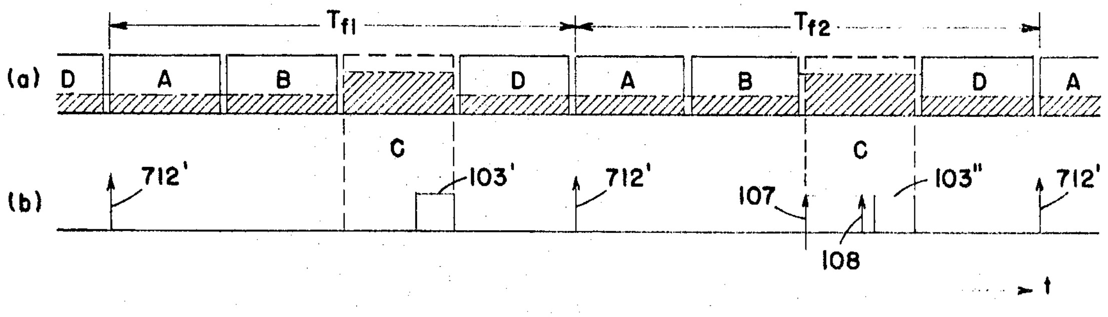

This will be described in more detail with reference to FIG. 6. Upon receipt by a self clock signal recovering circuit 101 of a timing signal 706 from the reference timing circuit 7 which indicates the position at which only the signal transmitted from its own station with which the circuit 10 is associated is to be received, the circuit 101 recovers the clock signal from such signal and provides an output signal 110 which is fed to the shift register 111 within the receiver pattern signal generator 11. The second signal generator 11 is substantially similar in construction as the transmitter signal generator 9, and includes the n-stage shift register 111 and a feedback circuit 112. The signal 110 acts as shift pulses to the shift register 111, which generates the same PN-code as generated at the transmitting terminal. The second function of the synchronizing circuit 10 is performed in the following manner. A synchronization control circuit 102 changes a switch 103 to an "a"-position and simultaneously opens a gate circuit 104 to provide a write-in the received signal 601 into the n-stage shift register 111, thereby sequentially supplying not less than *n* bits. Then the switch 103 is changed to a "b"-position to thereby complete a feedback loop, whereby the signal supplied to the shift register 111 is applied from the feedback circuit 112 to a comparator 105, as a feedback signal 115. The comparator compares the received signal 601 with the feedback signal 115 on the bit-for-bit basis, and the number of coincidences in the comparator is counted by a coincident number counter 106. The counter 106 is reset by a reset pulse 107 from the control circuit 102. After a predetermined time interval, the control circuit 102 produces a decision pulse 108 which causes a synchronization decision circuit 109 to determine whether or not the content of the counter 106 is no less than a predetermined threshold value. When it is determined by such process that the synchronization applies, then the pattern signal generator 11 is deemed to have established its synchronization. However, when the synchronization fails, the above procedure is repeated, in which case the timing is based on the signal from the reference timing circuit 7 and the detail will be described with reference to FIG. 7.

FIG. *7a* shows the allotment on the time axis of bursts from the respective earth stations, as is shown in FIG. 1. Pattern signals for the intended purpose of acquisition are transmitted in succession from the C station at a lower power level, as shown by hatched lines. Because of low power, these pattern signals will be masked by the signal of higher power of other stations, but still can be detected in the time slot assigned to the C station though with low power, which is indicated by the hatched pattern that is broadened in the time slot C. FIG. *7b* shows the relation of various timing signals with respect to the burst allotment. An arrow 712' indicate the reference timing position, or the position when the burst A of each frame $T_{f1}$, $T_{f2}$ .... of the reference station is detected, that is, when the frame counter 703 of the reference timing circuit 7 is reset to zero, thereby producing the reset pulse 712 (see FIG. 4). Write-in of the received signal 601 into the shift register 111 may take place anywhere within the time slot C, but for the present description, it is assumed that the write-in occurs at a last part 103' of the time slot. The signal that has been written into the shift register 111 at the position 103' is checked after nearly one frame, as in the frame $T_{f2}$ shown. Hence, the reset pulse 107 for the coincident number counter 106 is produced during the frame $T_{f2}$ around the start of the time slot assigned to the C station, and after a suitable time interval, the decision pulse 108 is produced. If it is determined that there has been an error in the received signal 601 that had been written into the shift register 111, the switch 103 is immediately changed to the "a"-position again, and once again the received signal 601 is sequentially supplied to the shift register 111, this position being indicated at 103''.

As a result, the pattern signal generator 11 of the receiving terminal will generate the pattern signal that has a time delay corresponding to the reflection period, $T_d$, with respect to that generated by the pattern signal generator 9 of the transmitting side. When the range between the earth stations the satellite remains constant, $T_d$ will be also constant, but $T_d$ varies as a function of time when such range varies with time. If the $T_d$ increases with time, the period, $T_R$, of the pattern generated by the pattern signal generator 11 will become longer than the period, $T_T$, of the pattern generated by the pattern signal generator 9. This means that the satellite is moving away from the earth stations, so that by virtue of the Doppler effect, the clock signal produced by the oscillator 8 of the transmitting terminal will decrease in frequency, when it is relayed by the satellite and recovered, upon receipt, by the clock signal recovery circuit 101. Consequently, it will be appreciated that when the both pattern signal generators 9 and 11 are operated in synchronism with one another, the continual monitoring of the phase difference, $T_d$, between the both pattern signals can produce information concerning the range between the earth station and the satellite and the radions velocity of the satellite (range rate).

The memory circuit 12 functions, under the control of the reference timing circuit 7, to store the status of the pattern signal generators 9 and 11 of the transmitting and receiving terminal and to detect the position in time when coincidence occurs between the memory content and the status of the pattern signal generators. When the pattern signal generators 9 and 11 are PN-code generators each comprising an n-stage shift register, the memory circuit 12 includes first and second memories, which store, under the control of the reference timing circuit 7, the status of the n-stage shift register 901 of the signal generator 9 and the status of the shift register 111 of the signal generator 11, respectively.

Figure 8:
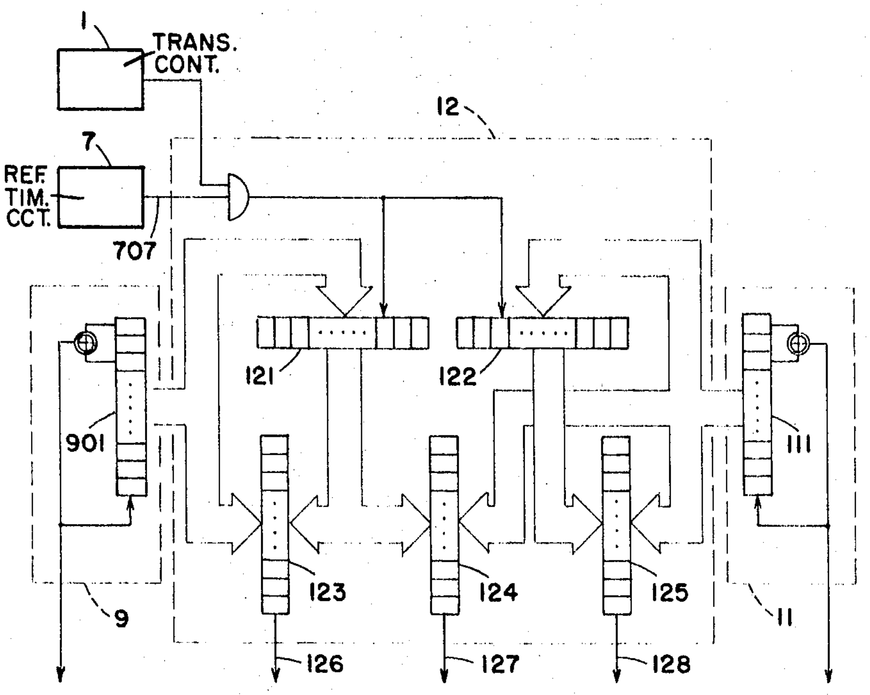
FIG. 8 shows a memory circuit.

Referring to FIG. 8, the memory circuit 12 includes a first memory 121 and a second memory 122 which receive a control signal 707 from the reference timing circuit 7. The signal 707 is in the form of a pulse that is applied to the memories 121 and 122 at the instant at which the status of the shift registers should be stored in them. The arrangement is such that the memories 121 and 122 store the status or markings at a particular instant of the n-stage shift registers 901 and 111, which can assume ($2^n-1$) different statuses, respectively, and the stored status is always compared with the content of the respective shift registers that varies from instant to instant to detect the time when the coincidence occurs. In the embodiment shown in FIG. 8, three comparators 123, 124 and 125 are provided at this end. The first comparator 123 compares the content of the first memory 121 which stores the status or markings at a particular instant of the shift register 901 with the varying status of the shift register 901, and produces a coincidence detection signal 126 upon detection of the coincidence therebetween. The second comparator 124 compares the shift register 111 against the first memory 121 to produce a coincidence detection signal 127 upon coincidence. The third comparator 125 is provided for the comparison between the second memory 122 and the shift register 111, and produces a coincidence detection signal 128 upon coincidence. The write-in control signals to the memories 121 and 122 include a control signal from the transmit control circuit 1 to be described later, in addition to the signal 707 from the reference timing circuit 7.

Referring again to FIG. 3, abscissa I represents a reference time $t$ as aforenoted and specifically represents the output of the reference timing circuit 7. The circuit 7 repeats its cycles with a period of $T_f$, and a position within a period can be represented by a phase, Q. Thus, in this time system, any point can be represented by the sum of a multiple of $T_f$ and Q. If it is assumed that one frame or $T_f$ includes $Q_f$ bits, then using an integer $m$ defined by the inequality $2^{m-1}<Q_f\leq 2^m$, Q can be represented by a binary number of $m$ bits. The abscissa II shows the status in time of the pattern signal generator 9 of the transmitting terminal, and the abscissa III shows the status in time of the pattern signal generator 11 of the receiving terminal.

Assume a suitable origin 0 as the reference time point as previously stated is fixed in the reference timing system to set $t$=0, at which time the pattern signal generator 9 of the transmitting terminal has a status $A_T$, and a corresponding signal is transmitted, and received after a time delay of $T_d(0)$ which corresponds to the time length required for the signal to traverse across the earth and the satellite, the reception being assumed to take place at the time of ($lT_f+Q'$) in the reference timing system. As will be noted from the description of the pattern signal generator 11 of the receiving terminal given previously, the pattern signal generator 11 will have a status $A_R$ which is identical with $A_T$. If the pattern signal generator 9 of the transmitting terminal had a repetition period $T_T$, then it will be evident that the status, $A_T'$, which appears at the interval $T_T$ after the occurrence of the initial status $A_T$, will be identical to this state $A_T$. Thus it is seen that by storing the status $A_T$ at $t$=0 in the first memory 121 of the memory circuit 12, the period $T_T$ can be determined from the coincidence of the memory and the status of the pattern signal generator 9 of the transmitting terminal, which can be detected by maintaining the comparison therebetween at all times. In addition, the comparison of the memory with the status of the pattern signal generator 11 of the receiving side provides $T_d(0)$. In the pattern signal generator 11 of the receiving side, a status $A_R'$ which is identical with the status $A_R$ will appear at one period, $T_R$, after the initial occurrence of the status $A_R$. Obviously, the position at which the status $A_R'$ occurs coincides in time with the position at which the status $A_T'$ is received. However, because of the presence of a time interval of $T_T$ between the status $A_T$ and the status $A_T'$, there will be in the meantime a change in the range between the earth station and the satellite, so that in general the time interval $T_d$ ($T_T$) corresponding to $A_T'-A_R'$ will be different from the time interval $T_d$ (0) corresponding to $A_T-A_R$, the interval $T_d$ ($T_T$) thus involving an increase or decrease in accordance with the change in the range between the earth and the satellite which took place during the interval of $T_T$. Thus the difference between $T_T$ and $T_R$ contains information concerning the time rate of change in the range between the earth and the satellite during the interval of $T_T$.

If the status or marking, $B_R$, of the pattern signal 11 of the receiving side is stored in the second memory 122 of the memory circuit 12, and the stored status is continuously compared with the varying status of the pattern signal generator 11, it is possible to know the time until the same status, $B_R'$, appears the next time. If this period is defined as $T_R'$, it is evident that $T_R'$ is equal to $T_R$ so long as the time rate of change in the range between the earth station C and the satellite 4 is constant. Explaining by way of the time diagram shown in FIG. 3, the objective of the invention is to know the actual transmit position, $T_c'$, of the signal so as to insert it in the preassigned time slot, $T_c$. More strictly, the position ($nT_f+T_c'$) would have to be determined to insert the signal at ($mT_f+T_c$), but a multiple of $T_f$ can be omitted since the reference timing circuit repeats its cycles with the period of $T_f$.

Figure 9:
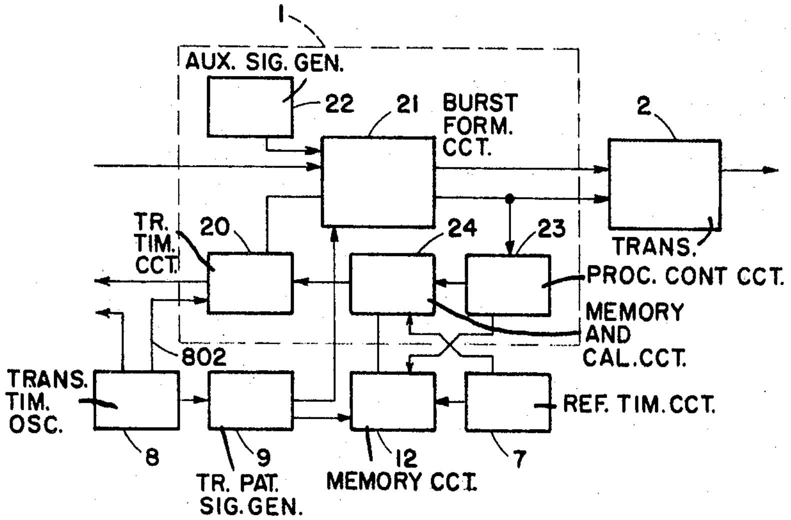
FIG. 9 shows a transmit control circuit and FIG. 10 is a more detailed circuit diagram of the memory and calculating circuit shown in FIG. 9.

Now reference is made to FIG. 9 in order to describe the function of the transmit control circuit 1 which controls the transmit position of a burst from a local station by utilizing the memory circuit 12 and the stored content therein. As shown, the transmit control circuit 1 includes a transmit timing circuit 20 which is supplied with a clock signal 802 from the transmit timing oscillator 8 as a time reference and which various timing signals. The transmit control circuit 1 further includes a burst forming circuit 21 which multiplexes various kinds of signals to form a burst, an auxiliary signal generator 22 which forms a special code for the burst synchronization or for the identification of the transmitting station, a process control circuit 23 which produces various control signals in a predetermined sequence to control the process of the acquisition and/or burst synchronization, and a memory and calculating circuit 24 which receives a control signal from the process control circuit 23 and determines the transmit position, $T_c'$, of a burst from its own station in which the circuit shown is provided. The detail of the memory and calculating circuit 24 is shown in FIG. 10, and it will be noted that the circuit 24 includes four circuits for storing the values of $T_c$, $T_c'$, Q' and D, that is, $T_c$-memory 31, $T_c'$-memory 32, Q'-memory 33, and D-memory 34, and in Q'it includes a D-sign memory 35, a calculator 36 for conducting an arithmetical operation four factors $T_c$, Q', and D-sign and D, and a comparator 37.

Figure 10:
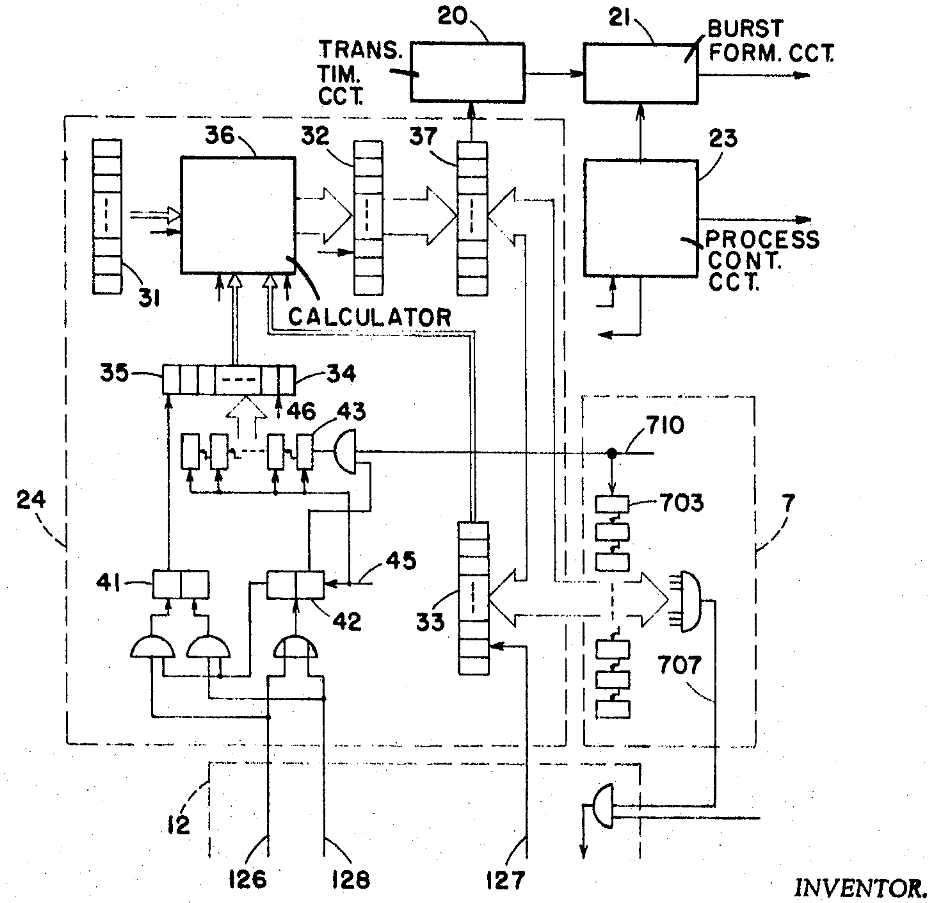

Referring to FIGS. 8 and 10, the process whereby the transmit position, $T_c'$, of its own station is determined will be described below. The reference timing circuit 7 produces a control signal 707 when the frame counter 703 is reset to zero, that is, at a reference point, $Q$=0, in the reference timing system. If there is a command from the process control circuit 23 of the transmit control circuit 1 at this time, and AND gate passes the signal 707 as a write-in control signal which causes the first memory 121 to store the status at this instant of the shift register 901 in the pattern signal generator 9, or $A_T$ (FIG. 3, abscissa II), and which also causes the second memory 122 to store the status at the same instant of the shift register 111 in the pattern signal generator 11, or $B_R$ (FIG. 3, abscissa III).

The second comparator 124 always maintains comparison between the content of the first memory 121 and the varying status of the shift register 111, and detects the position when the coincidence occurs therebetween, that is, $lT_f+Q'$. The output obtained from the comparator at this instant or the second coincidence detection signal 127 serves as a write-in control signal which causes the Q'-memory 33 to store the content of the frame counter 703 or the value of Q' represented in a binary number.

Also the comparison between the content of the first memory 121 and the varying status of the shift register 901 is always maintained by the first comparator 123, which detects the position of coincidence, that is, that of $A_T'$, by producing the first coincidence detection signal 126. In addition, the content of the second memory 122 is always compared with the varying status of the shift register 111 by the third comparator 125, which detects the position of coincidence or $B_R'$ by producing the third coincidence detection signal 128 (FIG. 8). The coincidence detection signals 126 and 128 are used to derive the value of D, that is, a time difference between the pattern periods $T_T$ and $T_R'$ (that is, $T_R$) and the sign of D, that indicates which of $A_T'$ and $B_R'$ occurs earlier.

Referring again to FIG. 10, the circuit 24 includes a D-sign detector 41, a gate signal generator 42 and a D-counter 43. Both of the gate signal generator 42 and the D-counter 43 are reset by a control signal 45 supplied by the process control circuit 23. One of the signals 126 and 128 from the memory circuit 12 whichever occurs first is fed into the D-sign detector 41, which therefore stores the sign of D. At the same time, the gate signal generator 42 is set to supply its output signal to the gate associated with the D-counter 43, thereby causing this counter initiate the counting of the reference timing clock signal 710. When the other of the signals 126 and 128 occurs, the signal generator 42 is reset to stop the counting operation in the counter 43. At this time, the input to the detector 41 is inhibited by gate circuits so that the stored D-sign remains unchanged. The value, represented in a binary number, and sign of D thus detected are entered into the D-memory 34 and D-sign memory 35, respectively, in response to another control signal 46 from the process control circuit 23.

The position in time, $T_c$, at which the burst from its own station is to be inserted is previously memorized in the $T_c$-memory 31, and therefore, all the information necessary to determine the transmit position, $T_c'$, of the burst from that station is made available by the operation thus for described. In response to a command provided by a control signal from the process control circuit 23, the calculator 36 effects an arithmetic operation $T_c-Q'\pm D=T_c'$, thereby producing $T_c'$ which is stored in the $T_c'$-memory 32. The double sign of D in the above formula is determined upon the content of the D-sign memory 35, that is, which of $A_T'$ and $B_R'$ occurred first. The content of the $T_c'$-memory 32 is always compared by the comparator 37 with the varying status of the frame counter 703 in the reference timing circuit 7, and upon detection of the coincidence therebetween, the coincidence detection signal from the comparator 37 is applied to the transmit timing circuit 20, whereupon the burst from the local station is transmitted, this beginning at $nT_f+T_c'$.

The quantities such as Q' and D used to evaluate $T_c'$ are functions of time, and so it is desirable that the absolute position in time, $nT_f+T_c'$, for transmitting the burst appears in a frame immediately following either $A_T'$ or $B_R'$ which occurs later. In FIG. 3, the position $nT_f+T_c'$ is shown spaced from $A_T'$ and $B_R'$ for the convenience of illustration, but in practice the period $T_T$ between $A_T$ and $A_T'$ or the period $T_R'$ between $B_R$ and $B_R'$ is on the order of 0.3 second or greater while one frame, $T_f$, is typically 125 mircroseconds, so that it is possible to transmit the burst at $nT_f+T_c'$ which is within 1 millisecond from the detection of either $A_T'$ or $B_R'$ which occurs later.

The burst synchronization may be achieved by suing the value of $T_c'$ for the transmission of the burst in every frame. However, because the factors Q' and D vary as a function of time, it is necessary to correct the values of these factors at a frequency dependent upon the rate at which they vary. This may be accomplished by continuously repeating the operation of the process control circuit 23 involved with the determination of $T_c'$, thereby always updating the content of the $T_c'$-memory 32. In this manner, the above-mentioned system can be used to achieve the burst synchronization.

The burst synchronization is a checking operation to see whether the condition once established by the acquisition process is maintained at all times. At this end, one to several bits are used per frame, and it is undesirable to use an increased amount of signal. As a technique therefore, the synchronization signal may comprise $n$ bits, per TDM-frame, which are obtained, as separated, from the output of the pattern signal generator 9 of the transmitting side. Alternatively, a single bit may be used per TDM-frame, and $n$ bits or more from the output of the pattern signal generator 9 of the transmitting terminal may be stored in a separate memory circuit having a corresponding capacity as the synchronization signal is transmitted, so that upon receipt of the synchronization signal, the content of said separate memory circuit may be compared with the output from the pattern signal generator 11 of the receiving terminal. Here again, if the failure of synchronization should be detected, the above $n$ bit signal can be used in the quick acquisition method mentioned above the achieve an immediate reestablishment of the synchronization. In either instance, the sane system can be used for the burst synchronization as used for the acquisition. For burst synchronization, the signal used is of normal power level as distinct from the acquisition process in which the signal is of lower power level.

From the foregoing, it will be understood that this invention can be modified in numerous respects without departure from the essential spirits thereof, and therefore it is intended to be limited solely by the appended claim.

What is claimed is:

1. Earth station terminal equipment for time division multiple access satellite communication including: means for receiving communication signals from a satellite, means for deriving from said communication signals received from said satellite a reference timing including the reference time point which is assumed as a beginning point of the period of a time division multiple access frame, and means for sending to said satellite a pattern signal having a marking at least at each said reference time point;

the improvement combination comprising:

first means for measuring on the basis of said reference timing the time interval between one of said reference points and the time point of reception of said pattern signal marking:

second means for measuring on the basis of said reference timing the difference between the spacing of said markings as transmitted and as received; and third means for deriving the algebraic sum of the results measured by said first and second means and a preassigned time period measured against said reference time point representing the position of a time slot reserved for use to transmit said communication signals from said earth station to said satellite.

2. Earth station equipment for time division multiple access satellite communication, including: means for deriving reference pulses from signals received from said satellite, each said pulse representing the reference time point which is assumed as a beginning point of the period of a time division multiple access frame, and means for sending to said satellite a first pattern signal having a first marking at least at each said reference time point;

wherein the improvement comprises:

storage means responsive to said first pattern signal for producing an output signal representative of said first-mentioned first markings;

means responsive to the first pattern signal received from said satellite for generating a second pattern signal having second markings occurring in coincidence with the first markings in said received first pattern signal;

comparing means responsive to said storage means output signal and to said second pattern signal for producing an output pulse each time said second markings occur;

phase means responsive to said reference pulses and to said comparing means output pulses for deriving a phase signal representative of an interval measured on the basis of said reference timing between one of said reference pulses and that one of said comparing means output pulses occurring the first time after said one reference pulse;

first means responsive to the first-mentioned first pattern signal for deriving a first signal representative of the spacing as measured on the basis of said reference timing between two successive first-mentioned first markings;

second means responsive to said second pattern signal for deriving a second signal representative of the spacing as measured on the basis of said reference timing between two successive second markings;

difference means responsive to said first and said second signals for deriving a difference signal representative of the difference between the first-mentioned first marking and said second marking; and means deriving the algebraic sum of said phase signal, said difference signal and the preassigned period measured against the reference time point representing the position of a time slot reserved for the transmission of said communication signals from said earth station to said satellite station to derive the algebraic sum.

3. In combination with a time division multiple access satellite communication system including successive time frame $T_f$, each having a plurality of equal time slots separated by equal time intervals, comprising:

a plurality of earth stations, each allotted one of said time slots for transmitting communication signals therein to other earth stations while receiving communication signals from said other stations in the remaining of said slots;

a satellite station for receiving said communication signals from each said earth station and transmitting said received communication signals to said other earth stations; and means to each said earth station for deriving from said communication signals received thereat through said satellite station a clock timing signal indicating a reference time point 0 establishing a beginning of the first of said allotted time slots in said frame $T_f$ to establish synchronization of said frames $T_f$;

means for determining a time $T_r'(=T_r-Q'\pm D)$ in successive frames $T_f$ to transmit said communication signals from a preselected earth station C, $T_r$ representing in each said frames $T_f$ a time period after which said communication signals are to be transmitted from said preselected earth station C; said preselected earth station C including;

a first generator for sending a first pattern signal having such low power level as not to interfere with said communication signals and transmitted to said satellite station which transmits said first pattern signal back to said preselected earth station C;

means for demodulating said first pattern signal received from said satellite station to provide a demodulated output signal;

a second generator for producing a second pattern signal;

means energized by said reference timing clock signal and said demodulated output signal for producing an output signal to activate said second generator to produce said second pattern signal in synchronism with said first pattern signal as received at said preselected station C, whereby said second pattern signal has a phase lag relative to said first pattern signal in correspondence with a time delay $T_d$ equal to round-trip transmission time of said first pattern signal between said preselected earth station C and said satellite station;

a memory responsive to three different pairs of coincident status signals for providing three corresponding output signals, said memory storing signals representing statuses AT and BR of said respective first and second pattern signals at said reference time 0; said memory comparing signals representing said stored first pattern signal status AT and said first pattern signal having a status AT′ for providing a first output signal indicating coincidence therebetween to determine a repetitive time period $T_T$ of said first generator; said memory comparing signals representing said stored first pattern signal AT and said second pattern signal having a status AR for providing a second output signal indicating coincidence therebetween to determine said time delay $T_d$; said memory comparing signals representing said stored second pattern signal status BR and another second pattern signal status BR′ for providing a third output signal indicating coincidence therebetween to determine a repetitive time period $T_R'$ of said second generator; said memory responsive to second output signal thereof and said derived timing signal for detecting time period $Q'$ $(=T_d-1T_f)$; said memory responsive to said first and third output signals thereof for detecting time period $D$ $(=T_R'-T_T)$; and a transmit control circuit responsive to signals representing said time periods $T_r$, Q′ and D and said derived clock timing signals for determining said time period $T_r'$ from the beginning of a frame $nT_f$ after which period $T_r'$ said preselected earth station C transmits said communication signal in said assigned slot therefor; said time period D having a + or a − sign depending on which of said statuses AT′ and BR′ occurs first in time and said $n$ being an integer.

4. The combination according to claim 3 in which said first generator comprises $n$-stage bit shift register means for producing a predetermined bit code having a repetition period of $(2^n-1)$ bits, said last-mentioned $n$ being an integer preselected to provide said first generator pattern signal repetitive time period $T_T$ with a duration which is longer than said time delay $T_d$.

5. The combination according to claim 4 in which said synchronism means comprises:

a second generator including $n$-stage bit shift register means producing said second pattern signal and being substantially identical in structure with that of said first generator $n$-stage bit shift register means;

clock signal means responsive to said clock signal representing said reference time period 0 for recovering clock signals during said time period $T_r$ from said demodulated output signal to provide output signals to shift said second generator shift register to provide said pattern signal identical with said first pattern signal; and bit comparing means responsive to at least a predetermined number of coincidence bit stored in said second generator shift register to represent said second pattern signal and bits representing said first pattern signal for providing an output signal to reset said comparing means to 0 coincidence to indicate synchronization between said first and second pattern signals in regard to the number of bits in said respective first and second pattern signals.

6. The combination according to claim 5 in which said memory comprises:

first means storing a signal representing said status AT of said first pattern signal at said reference time 0;

second means storing a signal representing said status BR of said second pattern signal at said reference time 0;

a first comparator comparing said signal stored in said first memory means and representing said status AT and a signal produced by said first generator and representing said first pattern signal having a status AT′ for producing an output signal indicating coincidence therebetween to determine said repetitive time period $T_T$;

a second comparator comparing said signal stored in said first memory means and representing said status AT said second pattern signal produced by said second generator and having a status AR for producing an output signal indicating coincidence therebetween to determine said time delay $T_d$; and a third comparator comparing said signal stored in second memory means and representing said status BR and second pattern signal produced by said generator and having a status BR′ for producing an output signal indicating coincidence therebetween to determine said repetitive time period $T_R'$.

7. The combination according to claim 6 in which said transmit control circuit comprises:

a transmit timing circuit;

signal burst forming circuit means;

a process control circuit providing command control signals; and calculating circuit means including:

a $T_c$ memory storing said term $T_c$;

a $T_c'$ memory;

a Q′ memory;

a D memory;

a ±D-sign memory;

an arithmetical calculator utilizing terms $T_c'$, $T_c$, Q′ and D of said $T_c'$, $T_c$, Q′ and D memories, respectively;

a fourth comparator; and counting means for detecting sign and value of said term D;

said timing circuit including means for counting said frames $T_f$ and producing a control signal when said frame counting means is reset to 0-count to indicate said Q′=0; said timing circuit responsive to a command signal from said process circuit to send said control signal to activate said first memory storing means to store said first pattern signal status AT and said second memory storing means to store said second pattern signal status BR; said second comparator output signal activating said Q′memory to store the count of said timing circuit frame counting means as the value of Q′ represented by a binary number; said D detecting counting means reset to 0-count by a command signal of said process circuit and responsive to said first and third comparator output signals to detect the sign of said term D depending on which of said latter signals occurs first in time for entering as a binary number in said D-sign memory and the value of said term D in relation to the count of said reference clock signals derived by said timing means for entering as a binary number in said D memory; said calculator responsive to aid binary numbers stored in said $T_c$, D-sign, D and Q′ memories for calculating $T_c'$in equation $T_c'=T_c-Q'\pm D$ for entering as a binary number in said $T_c'$memory; and a fourth comparator comparing binary numbers representing said term $T_c'$in said $T_c'$memory and said frame circuit in said timing circuit frame counting means so that upon coincidence therebetween said fourth comparator provides an output signal to activate said transmit timing circuit and thereby said signal burst forming circuit to transmit said communication signal therefrom beginning after a time $nT_f+T_c'$, where said latter $n$ is an integer.

* * * * *